June 15, 1965 R. R. HANSON ETAL 3,189,262
SPACE COOLERS
Filed April 10, 1961 10 Sheets-Sheet 1

INVENTORS
ROY R. HANSON AND
ELMER A. BRADEN

BY

ATTORNEY

June 15, 1965  R. R. HANSON ETAL  3,189,262
SPACE COOLERS
Filed April 10, 1961  10 Sheets-Sheet 2

INVENTORS
ROY R. HANSON AND
ELMER A. BRADEN
BY
ATTORNEY

INVENTORS
ROY R. HANSON AND
ELMER A. BRADEN
BY
ATTORNEY

June 15, 1965    R. R. HANSON ETAL    3,189,262
SPACE COOLERS
Filed April 10, 1961    10 Sheets-Sheet 4

INVENTORS
ROY R. HANSON AND
ELMER A. BRADEN
BY
ATTORNEY

INVENTORS
ROY R. HANSON AND
ELMER A. BRADEN

BY *Alfred W Petchaft*

ATTORNEY

June 15, 1965  R. R. HANSON ETAL  3,189,262
SPACE COOLERS

Filed April 10, 1961  10 Sheets-Sheet 6

INVENTORS
ROY R. HANSON AND
ELMER A. BRADEN

BY *Alfred W. Petchaft*

ATTORNEY

INVENTORS
ROY R. HANSON AND
ELMER A. BRADEN
BY
ATTORNEY

INVENTORS
ROY R. HANSON AND
ELMER A. BRADEN
BY
ATTORNEY

United States Patent Office 3,189,262
Patented June 15, 1965

3,189,262
SPACE COOLERS
Roy R. Hanson, Maryland Heights, Mo., and Elmer A. Braden, Springfield, Ill., assignors of one-sixth to William H. Anderson, Glencoe, Mo., one-fourth to Joseph H. Schierman and one-fourth to George A. Blase, both of the county of St. Louis, Mo.
Filed Apr. 10, 1961, Ser. No. 102,060
7 Claims. (Cl. 230—140)

The present application is a continuation-in-part of our copending application Serial No. 665,744, filed June 14, 1957, now Patent No. 3,001,384.

This invention relates in general to refrigerating equipment and, more particularly, to space coolers.

It is a primary object of the present invention to provide a space cooler employing a rotatable compressor housing having an evaporator and a condenser mounted on and rotatable therewith.

It is also an object of the present invention to provide a space cooler of the type stated in which the movement of the housing and related elements will produce all necessary circulation of air.

It is an additional object of the present invention to provide a space cooler of the type stated which utilizes a novel rotary type compressor.

It is another object of the present invention to provide a device of the type stated which can be easily, economically and compactly constructed.

It is a further object of the present invention to provide a space cooler of the type stated which is compact and contains a minimum number of moving parts.

It is also an object of the present invention to provide a space cooler having a unique type of control means which compensates for fluctuations in speed and demand.

With the above and other objects in view, our invention resides in the novel features of form, construction, arrangement, and combination of parts presently described and pointed out in the claims.

In the accompanying drawings (ten sheets)—

Referring now in more detail and by reference characters to the drawings, which illustrate practical embodiments of the present invention, A designates a space cooler comprising a support casting 1 integrally provided on one end with a split mounting hub 2 provided with a plurality of bracing ribs 3 which terminate in an enlarged annular ring 4. Rigidly secured to the split hub 2 by means of bolts 5 is a stationary rotor shaft 6 provided with an enlarged collar 7 having an eccentric shaft portion 8, the forward end of which is formed with another collar portion 9 and a short stub portion 10. The hub 2 is internally grooved for reception of an annular sealing ring 10′ which bears sealingwise against the shaft 6. Journaled on the stationary rotor shaft 6 by means of spaced aligned bearings 11, 12, is a rotatable cylindrical compressor housing 13 provided internally on one end with a retaining cap 14 for snug-fitting reception of the bearing 12. Secured to the housing 13 by means of bolts 15 adjacent the retaining cap 14 is a condenser support casting 16, the retaining cap 14, housing 13, and support casting 16 forming a V-shaped groove 17 for reception of an annular sealing ring 18. Rotatably mounted on the shaft 6 between the hub 2 and bearing 11 is a collar 19 peripherally grooved for reception of a sealing ring 20 which bears sealingwise against a diametrically reduced section 21 of the housing 13. Interposed between the collar 19 and the hub 2 is a seal 21′ and disposed between the bearing 11 and collar 19 is an annular disc-like spring d which urges the collar 19 against the seal 21′.

Figure 17:
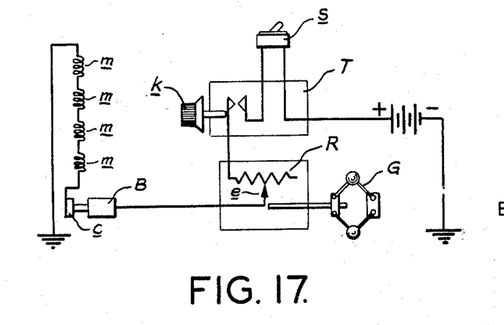
FIG. 17 is a wiring diagram showing a preferred control circuit forming a part of the present invention.

Rigidly mounted on the reduced portion 21 adjacent the hub 2 is a conventional electro-magnetic clutch member 22 having coils m and a conductor ring c which is contacted by a stationary brush B mounted on the support casting 1. Journaled on the reduced section 21 by means of a bearing 23 is a pulley 24 having an annular flange 25 which extends concentrically around the clutch member 22 and includes fixed magnetic rings 26, 26′, adapted for electro-magnetic interlocking with the clutch member 22, and trained around the pulley 24 is a V-belt 27 whereby the pulley may be driven by a suitable prime mover (not shown). The clutch coils m are connected in a control circuit as shown in FIG. 17 and presently more fully described. It will, of course, be evident that other types of clutch mechanisms can be employed if desired.

Figure 9:
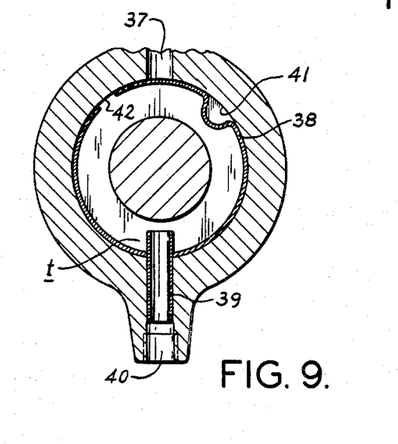
FIG. 9 is a fragmentary sectional view taken along line 9—9 of FIG. 5.
Figure 10:
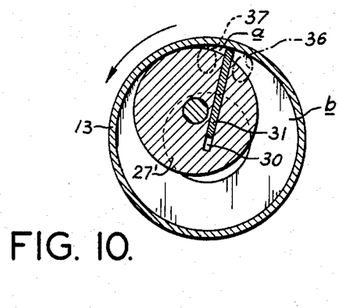
FIGS. 10 to 16, inclusive, are diagrammatic views similar to FIG. 6 and showing various operative positions of the compressor.

Rotatably mounted on the eccentric shaft portion 8 is a cylindrical compressor rotor 27′ split in the provision of a mounting block 28 provided with a chordwise extending slot 28′ which is aligned with a tapped hole 29 for reception of a locking screw 29′. Also formed in the rotor 27′ and disposed radially with respect to the housing 13 and in contact therewith is a slot 30 for slide-fitting reception of a thin flat compressor vane 31, the outer radial end of which is integrally provided with opposed pins 32, 33, which snugly engage corresponding recesses 34, 35, the recess 34 being formed in the retaining cap 14 and the recess 35 being formed in the housing 13. Also formed in the retaining cap 14 is an inlet port 36, and similarly formed in the housing 13 opposite the inlet port 36 and slightly offset therefrom, is an angularly inclined high pressure discharge passage 37 which communicates through a check valve 38 to a short tube 39 located in a condenser inlet line 40. As seen by reference to FIG. 9, the check valve 38 is formed of a resilient annular ring which normally bears against the wall of a cavity 41 and is disposed across the passage 37, the check valve 38 being split at 42 so as to permit a slight diametral contraction of the valve 38 and resultant opening of the passage 37, all for purposes presently more fully appearing.

Figure 1:
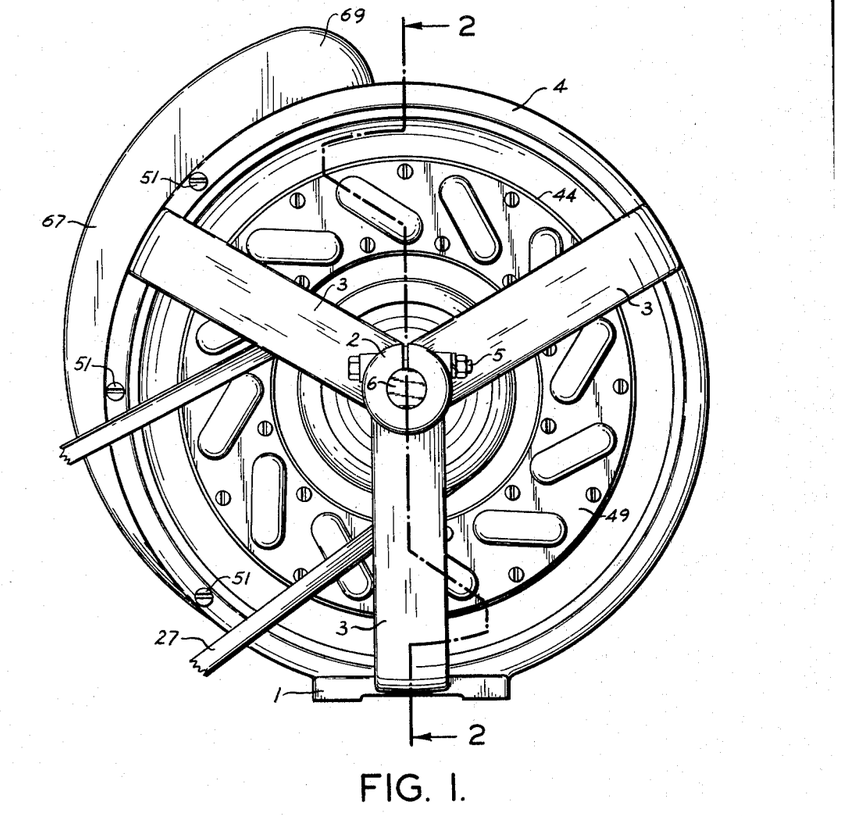
FIG. 1 is a rear elevational view of a rotary refrigeration machine constructed in accordance with and embodying the present invention.
Figure 2:
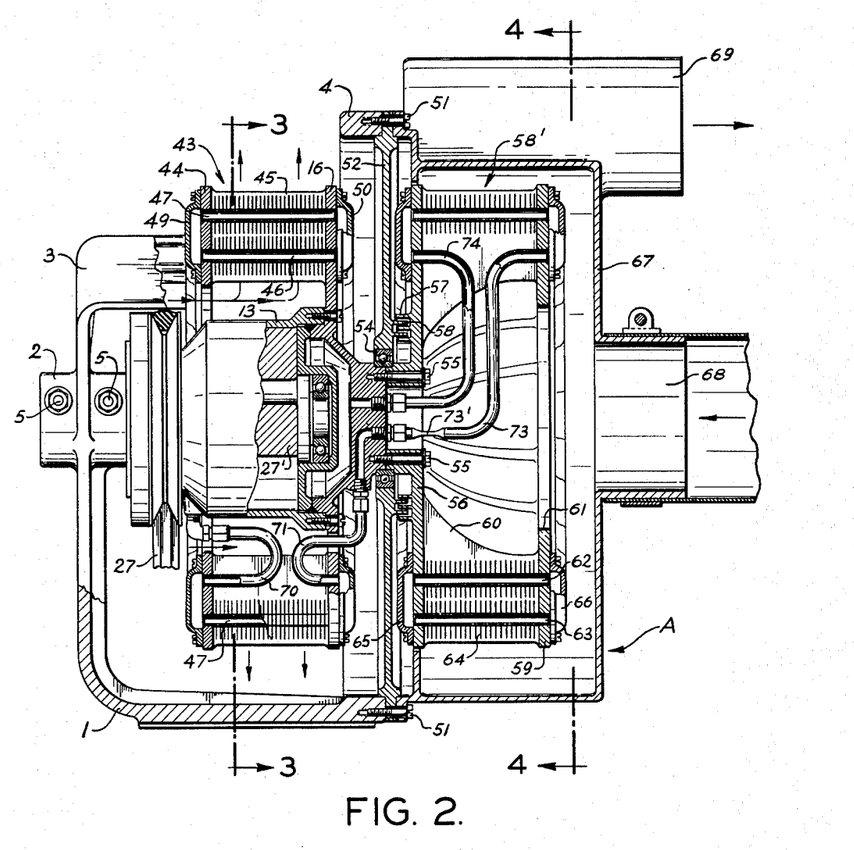
FIG. 2 is a sectional view taken along line 2—2 of FIG. 1.
Figure 3:
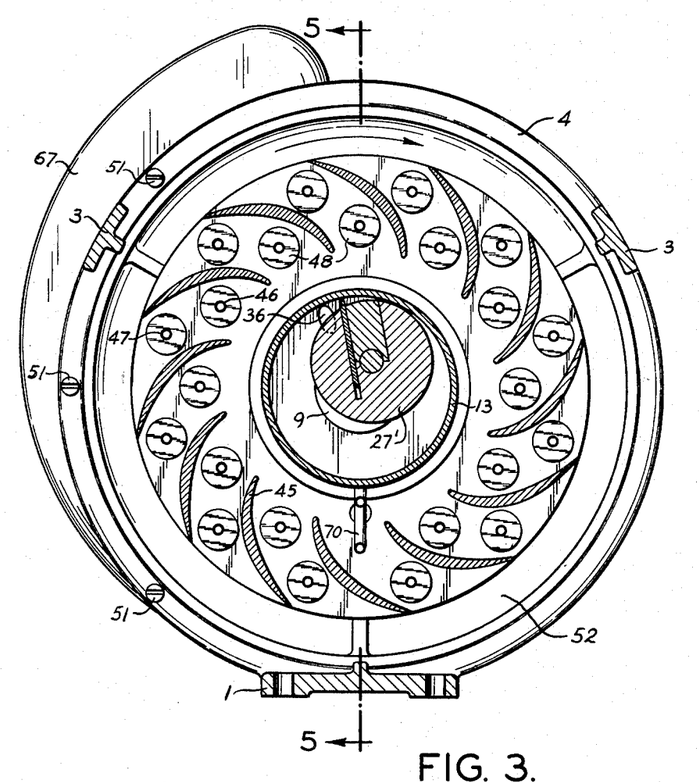
FIGS. 3 and 4 are sectional views taken along lines 3—3 and 4—4, respectively, of FIG. 2.
Figure 4:
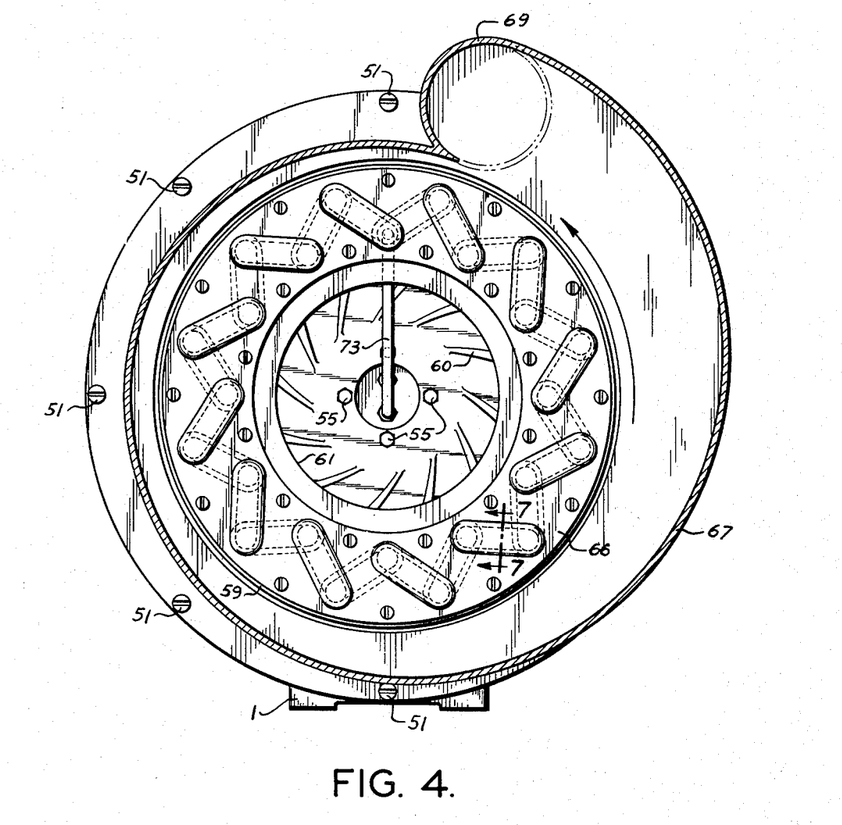

Mounter on the condenser support plate 16 is a condenser 43 including an outer end plate 44 which is rigidly supported in spaced relation to the plate 16 by a series of air impeller vanes 45, and extending between the plates 16, 44, are radially inner and outer series of tubes 46, 47, provided with heat dissipation fins 48. Bolted to the plates 16, 44, are cap members 49, 50, which provide communication between the tubes 46, 47. As seen by reference to FIGS. 2 and 3, the cap members 49, 50, are so positioned that they provide successive communication between the tubes 46, 47, so as to form a single conduit path through which the refrigerant may flow. Thus, the refrigerant will flow from one of the tubes 46 through one of the cap members 50, through one of the tubes 47, through one of the cap members 49, and then through the next succeeding tube 47, and so on, throughout the condenser unit 43.

Figure 5:
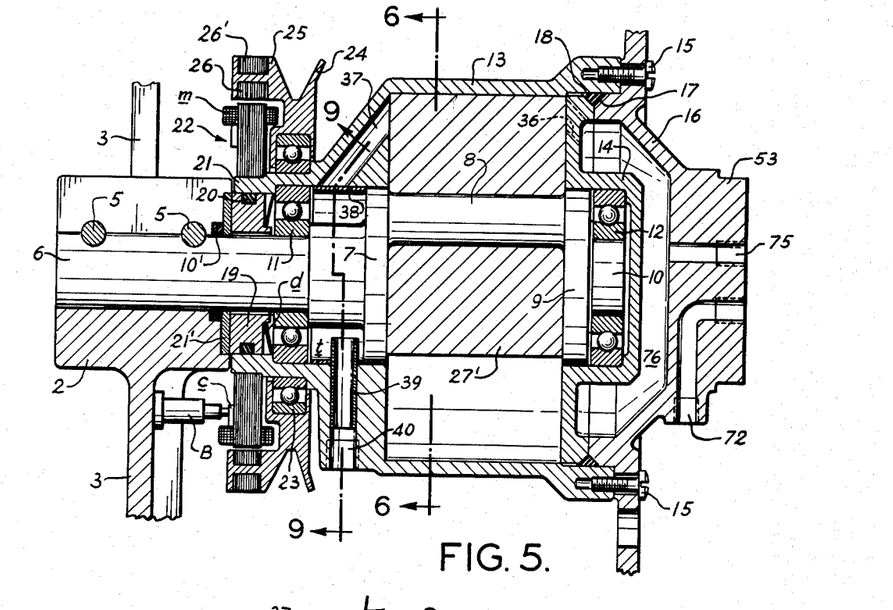
FIG. 5 is a fragmentary sectional view taken along line 5—5 of FIG. 3.
Figure 6:
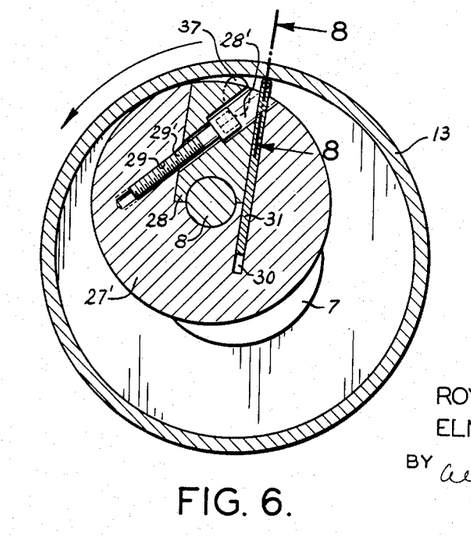
FIG. 6 is a fragmentary sectional view taken along line 6—6 of FIG. 5.
Figure 7:
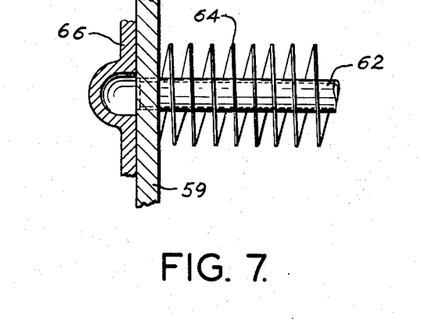
FIG. 7 is a fragmentary sectional view taken along line 7—7 of FIG. 4.
Figure 8:
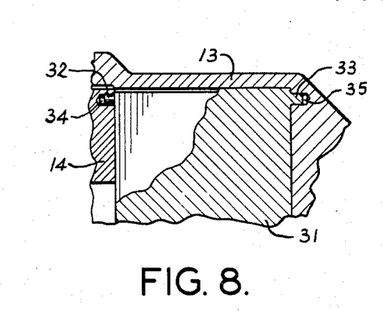
FIG. 8 is a fragmentary sectional view taken along line 8—8 of FIG. 6.

Secured by means of bolts 51 to the outer peripheral portion 4 of the support casting 1 is an insulating plate 52 which is supported on the hub portion 53 of the condenser support plate 16 by means of a bearing 54. Also secured to the hub portion 53 by means of bolts 55 is an evaporator support plate 56 provided with a series of axial fins 57 which interfit between corresponding fins 58 on the insulator plate 52 so as to provide a labyrinth seal. Mounted on the plate 56 is an evaporator 58' including an end plate 59 rigidly supported in spaced relation to the plate 56 by radially extending air impeller vanes 60, the end plate 59 being provided with a large central opening 61. Extending between the plates 56, 59, are radially inner and outer series of tubes 62, 63, provided with heat transfer fins 64 and bolted to the plates 56, 59, are cap members 65, 66, which provide successive communication between tubes 62, 63, in the same manner as that of the condenser 43, previously described, so as to form a continuous evaporator line. Secured to the outer periphery of the heat insulator plate 52 and enclosing the evaporator 58' is an air cooling chamber 67 provided with a warm air inlet passage 68 aligned with the opening 61 and formed on the outer periphery of the air cooling chamber 67 is a cold air discharge duct 69. As best seen by reference to FIGS. 2 and 5, the condenser inlet line 40 communicates with the condenser 43 through a conduit 70 and the condenser discharge line 71 communicates with a passageway 72 in the hub portion 53 which, in turn, communicates with an evaporator inlet line 73 having a capillary tube 73' formed therein. The evaporator discharge line 74 communicates with a passageway 75 in the hub portion 53 which, in turn, is open to the space 76 between the hub portion 53 and cap member 14, the space 76 communicating with the compressor inlet port 36.

As shown in FIG. 17, the space cooler A is preferably operated in combination with a control circuit which includes a main switch s and a thermostat T having a manually settable control knob k. Also included within the circuit is a rheostat R, the sliding element e of which is shifted responsive to the movement of a governor G. The governor, which may be of any conventional design, is connected to the sliding element e of the rheostat R in such a manner that, as the speed of the prime mover increases, a progressively larger amount of resistance is thrown into the circuit so as to reduce the strength of the electrical coupling between the coils m of the electro-magnetic clutch member 22 and the magnetic rings 26, 26'. Consequently, as the speed of the prime mover increases, there will be a greater degree of slippage between the electro-magnetic clutch member 22 and the pulley 24. Consequently, where the space cooler A is employed in connection with an automobile and the primer mover is the automobile engine, the speed of the compressor will remain substantially constant, notwithstanding wide fluctuations in engine speed. The thermostat T and switch s will, obviously, be mounted within the interior of the automobile and can be adjusted to maintain any desired degree of temperature by appropriate adjustment of the knob k. Similarly, the entire unit can be turned on and off by appropriate manipulation of the switch s.

Figure 11:
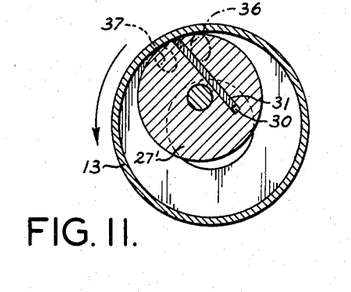
Figure 12:
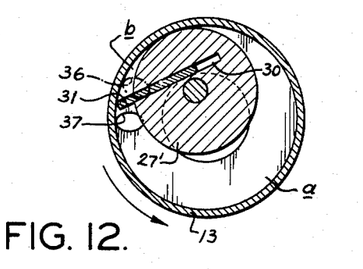
Figure 13:
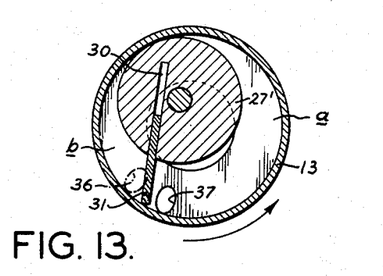
Figure 14:
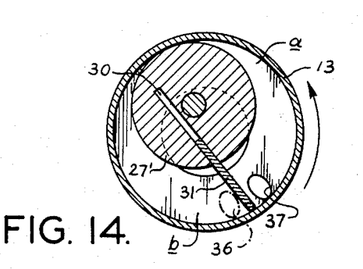
Figure 15:
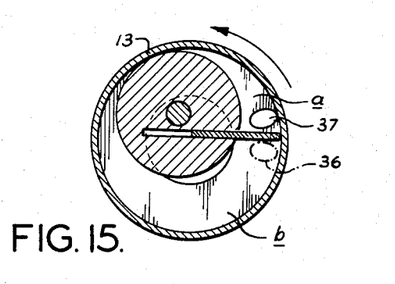
Figure 16:
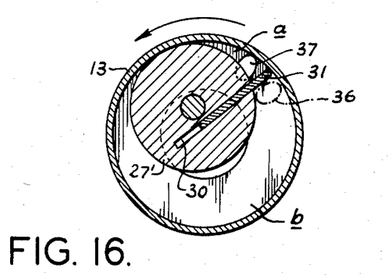

In use, the clutch member 22 is normally disengaged and the belt-driven pulley 24 is freely rotatable on the reduced portion 21 of the housing 13. Upon engagement of the clutch member 22, power is transmitted to the housing 13, causing it and the condenser 43 and evaporator 58' to rotate in unison. During such rotation, the vane 31 will assume intermediate positions, such as shown in FIGS. 10 through 16, so as to compress the refrigerant in the chamber a formed by the rotor 27', the housing 13, and the cap member 14. During one full revolution of the housing 13, it can be seen that the chamber a, which communicates with the passage 37, gradually becomes smaller and smaller while the chamber b, which communicates with the inlet port 36, gradually becomes larger and larger. As the pressure within the chamber a reaches condenser pressure, the check valve 38 diametrally contracts so as to permit the compressed refrigerant to pass into the tube 39, through the line 40, into the conduit 70, and into the condenser 43. The increasing volume of the chamber b provides a reduced pressure on the outlet side of the evaporator 58' so as to draw the refrigerant therefrom. As the housing 13 and rotor 27' move from the relative positions shown in FIG. 10 to that shown in FIG. 12, they will momentarily assume an intermediate position, such as shown in FIG. 11, wherein the ports 36, 37, are passed across the rotor 27'.

By reason of the fact that the condenser 43 and evaporator 58' rotate rapidly, the refrigerant liquid which is contained therein will, as a result of centrifugal force, flow along those portions of the interior surfaces which are radially remote. Consequently, a substantial area of the coils will always be wetted by a rapidly flowing film of liquid refrigerant and the K-factor of the system is, therefore, high.

Warm air is drawn axially through the inlet passage 68 and through the opening 61, being drawn therethrough by the air impeller vanes 60 which force the air radially outwardly across the evaporator 58' so as to become cooled, whereupon the cool air is discharged through the duct 69. Air is also drawn by the air impeller vanes 45 axially along and over the housing 13 and is forced radially outwardly over the condenser 43 so as to provide a forced air cooling of the condenser 43.

Since small quantities of oil may occasionally leak from the bearings 11, 12, the circulation of such oil through the unit is effectively reduced since any oil entering the chamber 41 will be collected in an oil trap t formed by the tube 39 and check valve 38 and is held therein by the centrifugal force of the rotating housing 13.

Figures 18, 19, 20:
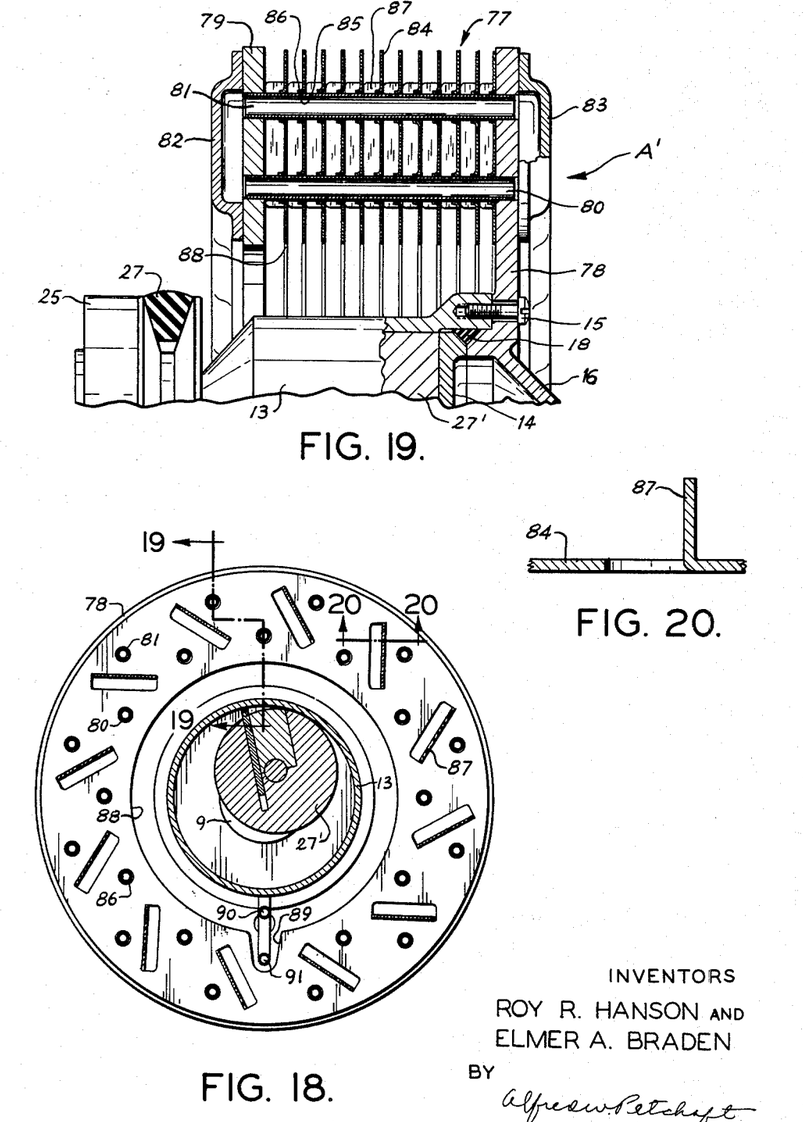
FIG. 18 is a fragmentary sectional view showing a modified form of the present invention.
FIGS. 19 and 20 are fragmentary sectional views taken along lines 19—19 and 20—20, respectively, of FIG. 18.
Figure 21:
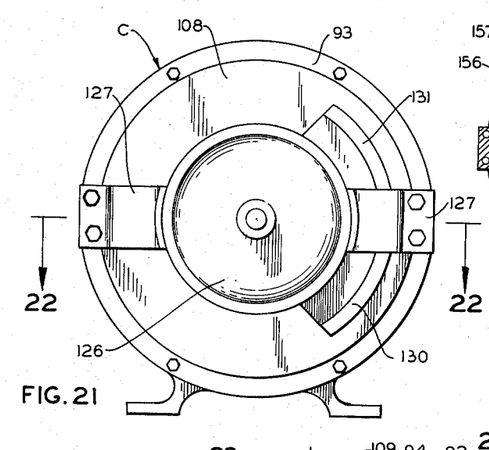
FIG. 21 is an end elevational view of a modified form of compressor constructed in accordance with and embodying the present invention.

It is also possible to provide a modified form of space cooler A', shown in FIGS. 18–20, similar to the space cooler A, previously described. In this form of the invention, a condenser 77 is provided with a support casting 78, outer end plate 79, inner and outer series of tubes 80, 81, and cap members 82, 83, all similar to, and interconnected in the same manner as, the corresponding parts of the condenser 43, previously described. Rigidly mounted on the tubes 80, 81, is a series of spaced parallel annular heat dissipation disks 84, each provided with spaced holes 85 through which the tubes 80, 81, extend, and surrounding the holes 85, are upstruck annular flanges 86 which bear against and grip the tubes 80, 81. Spanning the distance between successive disks 84 are circumferentially spaced, punched out, axially extending air impeller vanes 87. The disks 84 are also each provided with a large central opening 88 and a radially extending clearance slot 89 for reception of inlet and outlet conduits 90, 91.

During assembly of the condenser 77, the holes 85 are of such size as to permit the disks 84 to be easily slipped on the tubes 80, 81, and the disks 84 are held in spaced relation by the air impeller vanes 87. One of the conduits 90, 91, is then closed off and air under high pressure is introduced into the condenser 77, causing the tubes 80, 81, to diametrally expand a few thousandths of an inch into grip-forming engagement with the flanges 86, whereupon the tubes 80, 81, will remain snugly secured in position. It will, of course, be evident that an evaporator for the space cooler A' may also be constructed in the same manner as the condenser 77.

It is also possible to provide a modified form of compressor C, as illustrated in FIGS. 21 to 31, inclusive, including a stationary cylindrical compressor housing 92, which is integrally provided at one end with a radially outwardly extending annular flange 93 and at its other end with an integral flat end-wall 94, which, in turn, terminates at its inner margin in an outwardly extending coaxial journal housing 95. Rigidly seated in, and extending closurewise across, the interior end of the journal housing 95 is a journal collar 96 provided on its outer surface with an annular groove 97 which communicates with an outwardly extending small-diameter port 98 drilled or otherwise formed in and extending through the journal housing 95. The journal collar 96 is furthermore machined upon its inwardly presented face in common with the inwardly presented face of the end-wall 94 so that these faces are precisely coplanar or flush with each other and form an uninterrupted smooth surface.

Secured, by a series of bolts 99, upon and extending axially outwardly from the annular flange 93 is an intermediate housing plate 100 which is sealed against the annular flange 93 by an O-ring 101 and integrally includes a diametrally reduced cylindrical journal housing 102 which is coaxial with the journal housing 95. Rigidly seated in and extending closurewise across the inner end of the journal housing 102 is a journal collar 103 which is machined upon its inwardly presented face in common with the inwardly presented face of the housing plate 100 so that such faces are precisely coplanar and form a smooth uninterrupted surface. Also secured to the annular flange 93 in common with the housing plate 100, by means of the bolts 99, is a cylindrical end-shell 104 which is also sealed to the housing plate 100 by means of an O-ring 105. The end shell 104 is of substantially the same diametral size as the compressor housing 92 and has a flat end-wall 106 which is spaced axially outwardly from the end-wall of the journal housing 102 in the provision of an enclosed chamber 107.

Figures 22, 24:
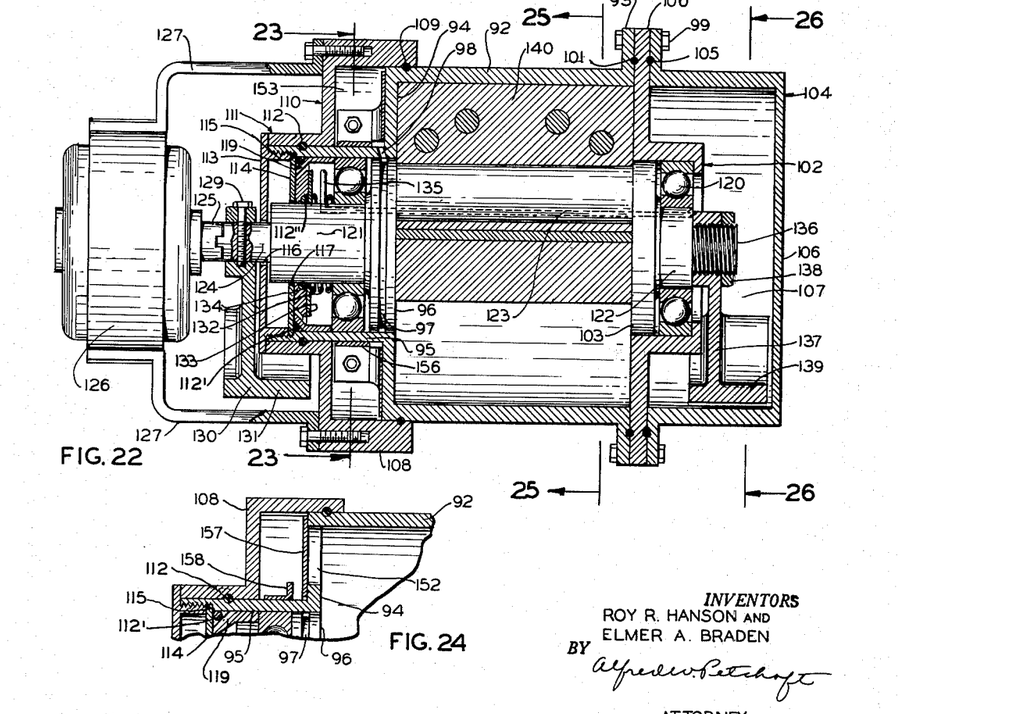
FIG. 22 is a horizontal sectional view taken along line 22—22 of FIG. 21.
FIG. 24 is a fragmentary sectional view taken along line 24—24 of FIG. 23.
Figure 23:
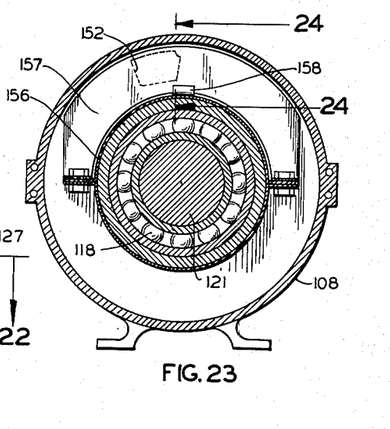
FIG. 23 is a transverse sectional view taken along line 23—23 of FIG. 22.

Mounted telescopically on the opposite end of the compressor housing 92 and extending axially over the journal housing 95 is a second end-shell 108 which is sealed to the compressor housing 92 by means of an O-ring 109. The end-shell 108 is integrally provided with a flat end-wall 110 which is disposed in outwardly spaced parallel relation to the end-wall 94 of the compressor housing 92 and is, in turn, integrally provided with diametrally reduced sleeve 111 which fits snugly against the journal housing 95 and is sealed thereto by means of an O-ring 112. The end-shell 108 is held in place by means of a locking collar 113 which is threadedly seated in the outer end of the journal housing 95 and, on its internal end, abuts against a sealing plate 114 which, in turn, is seated against an annular shoulder 115 formed in the journal housing 95. The locking collar 113 and the sealing plate 114 are both provided with coaxial apertures 116, 117, respectively, all as best seen in FIG. 22.

Snugly seated within the journal housing 95 is a conventional ball bearing 118 which is pressed snugly against the outer end face of the journal collar 96 by means of a pressure sleeve 119 which bears, at its opposite end, against the sealing plate 114 and is sealed thereagainst by an O-ring 112'. Similarly seated in the journal housing 102 and held between the end-wall thereof and the outer face of the journal collar 103 is a second conventional ball bearing 120. Formed integrally with, and projecting axially outwardly from, the journal collars 96, 103, are shaft elements 121, 122, which are respectively journaled in the ball bearings 118, 120, and the journal collars 96, 103, are further integrally connected across the compressor housing 92 by means of an eccentric shaft 123, the center line of which is parallel to, but spaced radially outwardly from, the common centerline of the shaft elements 121, 122, the latter, of course, being coaxial with the journal housings 95, 102. It should be noted, in this connection, that the journal collars 96, 103, the shaft elements 121, 122, and the eccentric shaft 123 may be assembled from separate elements or may be machined from a single piece of steel depending upon manufacturing convenience.

The shaft element 121 is turned down along its outer or left-hand end (reference being made to FIG. 22) in the provision of a terminal portion 124, which projects loosely and freely through the aperture 117 and is spline-coupled into the shaft 125 of a conventional electric motor 126, the latter being supported by means of two-legged mounting frame 127, which is, in turn, secured by means of bolts to the end-shell 108. Secured upon the outer end of the terminal portion 124, by means of a bolt 129, is a radial counterweight 130 having a head flange 131 which is disposed in radially spaced coaxial relation to the sleeve 111 of the end-shell 108.

Disposed loosely around the shaft element 121 within the journal housing 95 is a spiral spring 132 which bears at one end against the ball bearing 118 and at its other end against a pressure plate 133, which, in turn, abuts facewise against a sealing ring 134 which is sealed to the shaft element 121 by means of an O-ring 112" and is pressed against the sealing plate 114, so as to retain lubricants within the journal housing 95. Since it is desirable to use liquid lubricant within the journal housing 95, the shaft element 121 is provided with a radially outwardly projecting tubular oil-scoop 135 which opens internally to an axial oil duct 135" bored lengthwise through the eccentric shaft 123.

The shaft element 122 is similarly turned down at its outer end in the provision of a coaxial terminal portion 136 which projects through the end-wall of the journal housing 102 and is externally threaded for receiving a radial counterweight 137 which is held rigidly thereon by means of a locking nut 138. The counterweight 137 is integrally provided at its outer end with a head flange 139 which rotates freely within the chamber 107.

Rotatably mounted on the eccentric shaft 123 is a cylindrical compressor rotor 140 having a radial split 141 which is held together by means of dowel pins 142 and screws 143 to facilitate assembly of the rotor 140 upon the eccentric shaft 123. The rotor 140 is carefully machined across its end faces and is of such axial length as to fit snugly within the compressor housing 92 and bear slidingly against the inwardly presented end faces of the end-wall 94 and housing plate 100. Moreover, the rotor 140 is provided with a slot 144 which extends axially thereacross from one end of the rotor to the other and is located in non-radial eccentric relation to the eccentric shaft 123 for slide-fitting reception of a thin flat compressor vane 145, the outer end of which is cylindrically enlarged in the provision of an axial hinge-knuckle 146 for receiving a hinge-pin 147 which extends across the top of the compressor housing 92 and is seated at its opposite ends in the end-wall 94 and the housing plate 100, respectively, so that the compressor vane 145 will be rockably supported within the compressor housing 92. Thus, it will be apparent that as the eccentric shaft 123 rotates around the centerline of the shaft elements 121, 122, the rotor 140 will rotate upon the eccentric shaft 123 and will roll non-rotatively within the compressor housing 92. It will, of course, be apparent by reference to FIG. 25 that the rotor 140 is of such diametral size that its outer cylindrical surface will glide tightly, but nevertheless, smoothly over the interior cylindrical surface of the compressor housing 92. In addition to this, the slot 144 is provided at its outer end with an axially extending semi-cylindrical groove 148 which is intended to afford clearance against the hinge-knuckle 146 as the rotor passes through the top of its stroke. Internally within the slot 144, the rotor 140 is provided with an axially extending U-shaped slot 149 which contains a complementarily-shaped sealing blade 150 which bears against the flat face of the vane 145 to prevent pressurized gases from passing down along the vane from the pressure side to the low side through the slot 144. As will be seen by reference to FIG. 22, the axial length of the vane 145 is precisely equal to the axial length of the compressor housing 92, so that the end faces of the vane 145 will rock back-and-forth in gas-sealing operative contact against the inwardly presented faces of the end-wall 94 and the housing-plate 100, also for the purpose of preventing unauthorized leakage of refrigerant gas from the high side to the low side of the compressor C.

Figure 25:
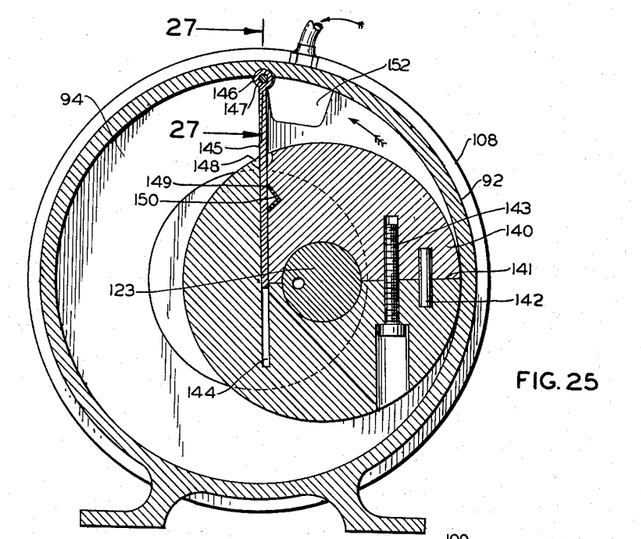
FIGS. 25 and 26 are transverse sectional views taken along lines 25—25 and 26—26, respectively, of FIG. 22.
Figures 26, 27:
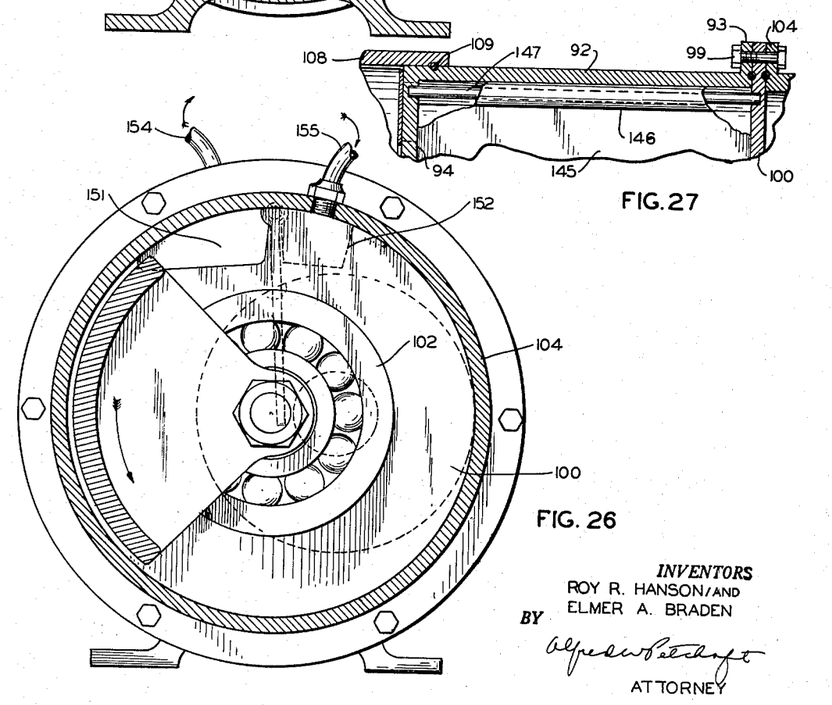
FIG. 27 is a fragmentary sectional view taken along line 27—27 of FIG. 25.
Figure 28:
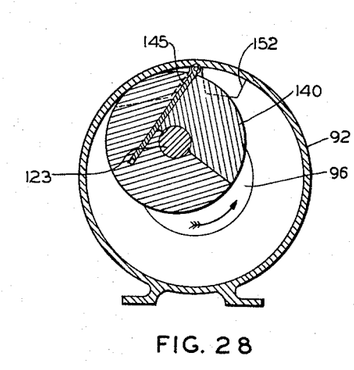
FIGS. 28 to 33, inclusive, are diagrammatic cross-sectional views showing various operative positions of the compressor during a single cycle of its operation.
Figure 29:
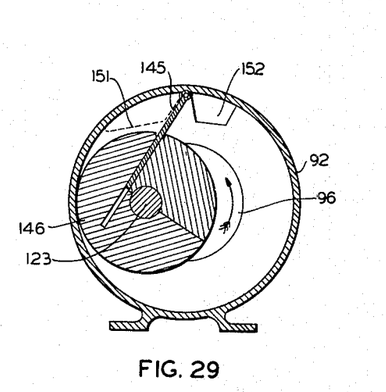
Figure 30:
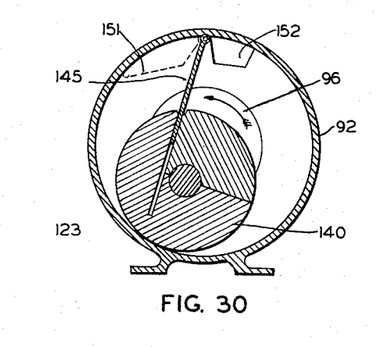
Figure 31:
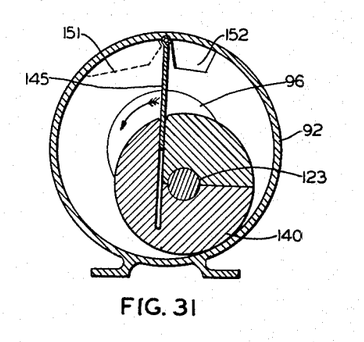
Figure 32:
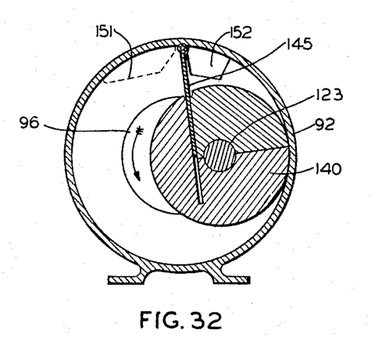
Figure 33:
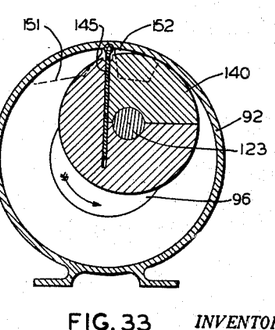

If it be assumed, for purposes of illustration herein, that the rotor 140 will rotate in a counter-clockwise direction, that is to say, the direction indicated by the arrow in FIG. 25, then the housing-plate 100 is provided with a relatively large intake opening 151 located on the suction side (i.e. the left-side as shown in FIG. 26) with respect to the vane 145. Similarly, the end-wall 94 of the compressor housing 92 is provided with a somewhat smaller discharge opening 152 located on the pressure side (i.e. right-side as shown in FIGS. 25 and 26) with respect to the vane 145. The intake opening 151 communicates with the chamber 107 and the discharge opening 152 communicates with a chamber 153 formed by the end-shell 108 around the opposite end of the compressor housing 92. The chambers 107 and 153 are respectively provided with a suction or intake line 154 and a pressure or discharge line 155 which are conventionally connected to the evaporator and condenser of a refrigeration system through conventional controls (not shown).

Clamped externally upon, and extending around, the portion of the journal housing 95 which extends through the chamber 153 is a mounting ring 156 which is integrally provided with a radially upwardly extending flat, arcuate valve-plate 157 which is formed of resilient spring-steel and normally seats in closurewise relation across the discharge opening 152, but is sufficiently resilient to flex outwardly away from closure-forming position under pressure of compressed refrigerant gas which intermittently flows outwardly from the compressor housing 92 as the rotor 140 reaches the top of its stroke. The clamping ring 156 is provided with an upturned stop-forming ear 158 located approximately in the center of the lower margin of the valve-plate 157 so as to prevent excessive outward movement thereof, but nevertheless permitting sufficient movement of the valve-plate 157 to allow unobstructed flow of compressed gas from the compressor housing 92 into the chamber 153.

In use, the motor 126 is energized and the eccentric shaft 123 rotated, thereby producing orbital movement of the rotor 140 and rocking movement of the vane 145. During such orbital movement, the rotor 140 and the vane 145 will move through the various positions shown in FIGS. 28 to 33, inclusive, thereby drawing refrigerant gas through the intake opening 151, compressing it, and discharging it under pressure through the discharge opening 152, substantially in the same manner as previously described in connection with the compressor rotor 27'.

It should be understood that changes and modifications in the form, construction, arrangement, and combination of the several parts of the space coolers may be made and substituted for those herein shown and described without departing from the nature and principle of our invention.

Having thus described our invention, what we claim and desire to secure by Letters Patent is:

1. A compressor for use in space coolers and the like, said compressor comprising a rotatable housing having walls defining a cylindrical chamber, said walls being provided with opposed inlet and outlet ports located in arcuately spaced relation to each other with respect to the direction of rotation of the housing, a fixed rotor shaft mounted within said housing and being provided with a portion eccentric to the axis of rotation of said housing, a rotor rotatably mounted on said eccentric portion, and means rockably secured to said housing between the inlet and outlet ports, said means being adapted for slide-fitting reception within the rotor for forming a fluid barrier between said ports, said means being in spaced parallel relation to the axis of said eccentric portion.

2. A compressor for use in space coolers and the like, said compressor comprising a rotatable housing having walls defining a cylindrical chamber, said walls being provided with opposed inlet and outlet ports located in arcuately spaced relation to each other with respect to the direction of rotation of the housing, a fixed rotor shaft mounted within said housing and being provided with a portion eccentric to the axis of rotation of said housing, a rotor rotatably mounted on said eccentric portion, and a compressor vane rockably secured to said housing between the inlet and outlet ports, said compressor vane being adapted for slide-fitting reception within the rotor eccentric of the axis thereof for forming a fluid barrier between said ports.

3. A compressor for use in space coolers and the like, said compressor comprising a rotatable housing having walls defining a cylindrical chamber, said walls being provided with opposed inlet and outlet ports located in arcuately spaced relation to each other with respect to the direction of rotation of the housing, a fixed rotor shaft mounted within said housing and being provided with a portion eccentric to the axis of rotation of said housing, a rotor rotatably mounted on said eccentric portion, a compressor vane adapted for slide-fitting reception within said rotor, and means on the outer radial end of said vane for rockably securing it to said housing between the inlet and outlet ports.

4. A compressor for use in space coolers and the like, said compressor comprising a rotatable housing having walls defining a cylindrical chamber, said walls being provided with opposed inlet and outlet ports located in arcuately spaced relation to each other with respect to the direction of rotation of the housing, a fixed rotor shaft mounted within said housing and being provided with a split rotor rotatable eccentric to the axis of rotation of said housing, a compressor vane adapted for slide-fitting reception within said rotor and extending substantially radially of the axis of said housing for forming a fluid barrier between said ports, and means on the outer radial end of said vane for rockably securing it to said housing between the inlet and outlet ports.

5. A compressor comprising a base, a shaft fixedly mounted to said base, said shaft being provided intermediate its ends with a substantially eccentric portion, an arcuate member rotatably mounted on said eccentric portion, a housing rotatably mounted on said shaft and being provided with walls defining a cylindrical inner chamber, said walls having formed therein an inlet and an outlet port located in arcuately spaced relation to each other with respect to the direction of rotation of the housing, a vane slidably mounted in said arcuate member and being connected along one margin to said inner chamber between the inlet and outlet ports whereby as said housing rotates with respect to said shaft said vane also rotates causing said arcuate member to rotate with respect to said eccentric portion and said vane to slide inwardly and outwardly in said arcuate member, and a check valve operatively connected to said outlet port.

6. A compressor, said compressor comprising a rotatable housing having walls defining a cylindrical chamber, said walls being provided with opposed inlet and outlet ports located in arcuately spaced relation to each other with respect to the direction of rotation of the housing, a rotor shaft mounted within said housing and being provided with a portion eccentric to the axis of rotation of said housing, a rotor rotatably mounted on said eccentric portion, a compressor vane adapted for slide-fitting reception within said rotor, and means on the outer radial end of said vane for rockably securing it to said housing between the inlet and outlet ports.

7. A compressor, said compressor comprising a rotatable housing having walls defining a cylindrical chamber, said walls being provided with opposed inlet and outlet ports located in arcuately spaced relation to each other with respect to the direction of rotation of the housing, a rotor shaft mounted within said housing and being provided with a split rotor rotatable eccentric to the axis of rotation of said housing, a compressor vane adapted for slide-fitting reception within said rotor and extending substantially radially of the axis of said housing for forming a fluid barrier between said ports, and means on the outer radial end of said vane for rockably securing it to said housing between the inlet and outlet ports.

References Cited by the Examiner

UNITED STATES PATENTS

| | | | |
|---|---|---|---|
| 503,611 | 8/93 | Marcus | 103—132 |
| 1,223,919 | 4/17 | Wilson | 230—140 |
| 1,352,107 | 9/20 | Wagenhorst | 230—140 |
| 1,635,523 | 7/27 | Wilson | 230—140 |
| 1,969,999 | 8/34 | Cuthbert | 230—147 |
| 2,324,434 | 7/43 | Shore | 230—140 |
| 2,331,878 | 10/43 | Wentworth | 230—140 |
| 2,440,593 | 4/48 | Miller | 230—140 |
| 2,643,817 | 6/53 | Makaroff et al. | 230—147 |
| 2,670,894 | 3/54 | Warrick et al. | 230—140 |
| 2,969,021 | 1/61 | Menon | 103—121 |
| 2,969,743 | 1/61 | Menon | 103—121 |
| 3,001,384 | 9/61 | Hanson et al. | 230—140 |
| 3,026,021 | 3/62 | Emanuel | 230—140 |

KARL J. ALBRECHT, *Primary Examiner.*

ROBERT A. O'LEARY, JOSEPH H. BRANSON, Jr., WILBUR J. GOODLIN, *Examiners.*